(12) United States Patent
Tanaka et al.

(10) Patent No.: US 12,319,818 B2
(45) Date of Patent: Jun. 3, 2025

(54) CHARGE-ADJUSTMENT POWDER HAVING EXCELLENT ABILITY TO MAINTAIN APPLIED CHARGE, AND METHOD OF MANUFACTURING THE SAME

(71) Applicant: Titan Kogyo Kabushiki Kaisha, Yamaguchi (JP)

(72) Inventors: Takayasu Tanaka, Yamaguchi (JP); Toshimasa Seki, Yamaguchi (JP); Takafumi Tanaka, Yamaguchi (JP); Tomoko Yoshimi, Yamaguchi (JP); Toru Kumagai, Yamaguchi (JP)

(73) Assignee: Titan Kogyo Kabushiki Kaisha, Yamaguchi (JP)

( * ) Notice: Subject to any disclaimer, the term of this patent is extended or adjusted under 35 U.S.C. 154(b) by 170 days.

(21) Appl. No.: 17/798,677

(22) PCT Filed: Feb. 9, 2021

(86) PCT No.: PCT/JP2021/004729
§ 371 (c)(1),
(2) Date: Aug. 10, 2022

(87) PCT Pub. No.: WO2021/166737
PCT Pub. Date: Aug. 26, 2021

(65) Prior Publication Data
US 2023/0078855 A1    Mar. 16, 2023

(30) Foreign Application Priority Data

Feb. 21, 2020  (JP) .................. 2020-027942

(51) Int. Cl.
*C09C 1/36* (2006.01)
*C09C 3/06* (2006.01)

(52) U.S. Cl.
CPC ............ *C09C 1/3661* (2013.01); *C09C 3/063* (2013.01); *C01P 2004/03* (2013.01);
(Continued)

(58) Field of Classification Search
CPC ... C09C 1/3661; C09C 3/063; C01P 2004/84; C01G 33/00
See application file for complete search history.

(56) References Cited

U.S. PATENT DOCUMENTS

2018/0246441 A1*  8/2018  Anezaki .............. G03G 15/162

FOREIGN PATENT DOCUMENTS

| JP | 60-264326 A | 12/1985 |
| JP | 61-283679 A | 12/1986 |

(Continued)

OTHER PUBLICATIONS

International Application No. PCT/JP2021/004729, International Search Report mailed May 18, 2021, 4 pages.

*Primary Examiner* — Khanh T Nguyen
(74) *Attorney, Agent, or Firm* — COZEN O'CONNOR

(57) ABSTRACT

Provided is a charge-adjustment powder having an excellent ability to regulate a charging property on a surface of a target to be charge-adjusted within a certain range, and to maintain the applied charge. The charge-adjustment powder is formed with particles having titanium-niobium oxide on at least a part of a surface of a core, and the content of an alkali metal is set to be 20.0 mmol/kg or less based on the whole.

11 Claims, 2 Drawing Sheets

(52) U.S. Cl.
CPC ...... *C01P 2004/84* (2013.01); *C01P 2006/12* (2013.01); *C01P 2006/40* (2013.01); *C01P 2006/80* (2013.01)

(56) References Cited

FOREIGN PATENT DOCUMENTS

| | | |
|---|---|---|
| JP | 2011-1239 A | 1/2011 |
| JP | 2018-141058 A | 9/2018 |
| WO | 2007148747 A1 | 12/2007 |

\* cited by examiner

CHARGE-ADJUSTMENT POWDER HAVING EXCELLENT ABILITY TO MAINTAIN APPLIED CHARGE, AND METHOD OF MANUFACTURING THE SAME

This application is a national stage application of PCT/JP2021/004729 filed on Feb. 9, 2021, which claims priority to Japanese App. No. 2020-027942, filed on Feb. 21, 2020, the entirety of which is incorporated herein by reference.

TECHNICAL FIELD

The present invention relates to a charge-adjustment powder for use in adjusting a charge generated on a surface of a paint, a functional powder, a film, a fiber, a resin, a plastic, a paper, and the like, and to a method of manufacturing the same.

BACKGROUND ART

Powders composed of a metal oxide having conductivity, and paints, fibers, plastics, papers, and the like containing the powder are used for preventing charge and eliminating static electricity with the conductivity of the metal oxide.

For example, Japanese Patent Laid-Open No. 2002-339235 (PTL 1) discloses a method of manufacturing a textile having an excellent antistatic property by performing a low-temperature plasma treatment on a textile weaved by arranging, at regular intervals, conductive synthetic fibers in which titanium oxide particles with carbon black-coated or tin oxide-coated surface are dispersed. Japanese Patent Laid-Open No. 2010-59588 (PTL 2) proposes a polyester-based composite fiber having an excellent coloring property, the fiber being composed of a nonconductive layer and a conductive layer of a thermoplastic polymer containing titanium oxide particles having a conductive coating such as tin oxide. The polyester-based composite fiber disclosed in PTL 2, which has the conductive layer inside the fiber, inhibits charging static electricity, and has an antistatic property.

These conductive metal oxides, and paints, fibers, plastics, papers, and the like containing the metal oxide have a purpose or effect of preventing generation of charge on the surface or eliminating generated static electricity. However, opportunities to use static electricity in the industries such as electric dust collection, electrostatography, and electrostatic coating have increased in recent years, and a charge-adjustment powder not only simply eliminating applied charge but also regulating the amount of charge to be applied has been required.

The present applicant disclosed a charge-adjustment powder having core particles of titanium dioxide and a coating layer of niobium-doped titanium dioxide on a surface of the core particles (Japanese Patent Laid-Open No. 2018-141058) (PTL 3). Mixing or applying this charge-adjustment powder can prevent a target surface from charging static electricity, and in addition, can adjust a charge amount to be negative.

CITATION LIST

Patent Literature

PTL 1: Japanese Patent Laid-Open No. 2002-339235
PTL 2: Japanese Patent Laid-Open No. 2010-059588
PTL 3: Japanese Patent Laid-Open No. 2018-141058

SUMMARY OF INVENTION

Technical Problem

The charge-adjustment powder in PTL 3 aims to prevent static electricity from charging, and the applied charge tends to be immediately attenuated. For the purpose of stably regulating the amount of charge to be applied, the charge-adjustment powder in PTL 3 is difficult to be used. In particular, the applied charge tends to flow outward under high humidity.

An object of the present invention is to provide a charge-adjustment powder having an excellent ability to regulate a charging property within a certain range on each surface of targets to be charge-adjusted such as a paint, a functional powder, a film, a fiber, a resin, a plastic, and a paper, and to maintain the applied charge by adding, mixing, or applying the powder to the targets to be charge-adjusted. An object of the present invention is also to provide a method of manufacturing the above charge-adjustment powder.

Solution to Problem

The present inventors have made intensive investigation on the charge-adjustment powder, and have found that, in a powder composed of particles having titanium-niobium oxide on at least a part of a surface of a core of the particle, the content of an alkali metal of 20.0 mmol/kg or less based on the whole powder improves the ability to maintain the applied charge.

Specific aspects of the present invention are as follows, but not limited thereto.

[1] A charge-adjustment powder comprising particles having titanium-niobium oxide on at least a part of a surface of a core, wherein a content of an alkali metal is 20.0 mmol/kg or less based on the whole powder.

[2] The charge-adjustment powder according to [1], wherein a sum of the content of the alkali metal and a content of sulfur is 35.0 mmol/kg or less based on the whole powder.

[3] The charge-adjustment powder according to [1] or [2], wherein a content of niobium is 15.0 mmol/kg or more and 225.0 mmol/kg or less based on the whole powder.

[4] The charge-adjustment powder according to any one of [1] to [3], wherein the core is titanium dioxide.

[5] The charge-adjustment powder according to any one of [1] to [4], wherein depressions are observed on at least a part of a surface of the particles that constitute the powder when observed using a scanning electron microscope with a magnification of 50000.

[6] The charge-adjustment powder according to any one of [1] to [5], wherein the number of depressions observed on a surface of the particles that constitute the powder when observed using a scanning electron microscope with a magnification of 50000 is 10 or more per 1 $\mu m^2$ of the surface of the particles.

[7] The charge-adjustment powder according to any one of [1] to [6], wherein S1/S2 is more than 1.05, where S1 represents a surface area per 1 g measured with a BET method, and S2 represents a surface area per 1 g calculated from a median diameter on a volume basis obtained by observation with a scanning electron microscope.

[8] A method of manufacturing the charge-adjustment powder according to any one of [1] to [7], comprising the following steps A to D:

step A of dispersing a powder to be a core in water to obtain a suspension of the core;

step B of adding an acidic mixed liquid of a titanium salt and a niobium salt, and an alkaline solution to the suspension obtained in step A, and neutralizing the acidic mixed liquid of a titanium salt and a niobium salt with the alkaline solution, to thereby precipitate hydroxides of titanium and niobium on at least a part of a surface of the core;

step C of removing water-soluble salts from a suspension obtained in step B and performing solid-liquid separation; and step D of calcining a solid obtained in step C.

[9] The method of manufacturing the charge-adjustment powder according to [8], wherein in step B, the neutralization is performed at a pH of the suspension of 1.0 or higher and 6.0 or lower.

[10] The method of manufacturing the charge-adjustment powder according to [8] or [9], wherein in step B, the acidic mixed liquid of a titanium salt and a niobium salt, and the alkaline solution are added simultaneously.

[11] The method of manufacturing the charge-adjustment powder according to any one of [8] to [10], wherein step D comprises calcining the solid at 250° C. or higher and 900° C. or lower in an air atmosphere, an inert atmosphere, a reducing atmosphere, or an atmosphere having a lower oxygen concentration than air.

Advantageous Effects of Invention

The present invention provides the charge-adjustment powder having an excellent ability to maintain the applied charge by using the particle having the content of the alkali metal of 20.0 mmol/kg or less based on the whole powder and having the titanium-niobium oxide on a part of the surface of the core. In particular, the charge-adjustment powder has an excellent ability to maintain the applied charge even when exposed to high humidity.

DESCRIPTION OF EMBODIMENTS

Figure 1:
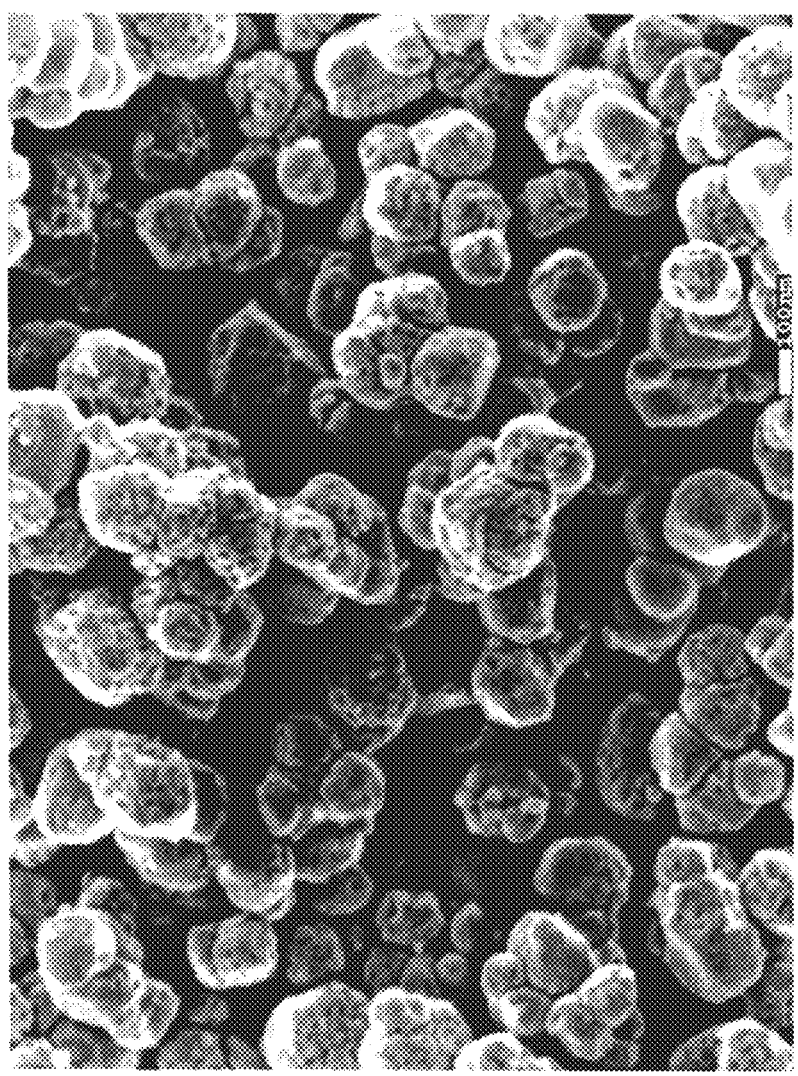
FIG. 1 is a scanning electron microscopic image of a charge-adjustment powder obtained in Example 5.

A charge-adjustment powder of the present invention comprises particles having titanium-niobium oxide on at least a part of a surface of a core of the particle, and the content of an alkali metal is 20.0 mmol/kg or less based on the whole powder.

The charge-adjustment powder preferably has titanium dioxide as the core, and preferably has a composite oxide of titanium and niobium on the surface. The amount of niobium in the charge-adjustment powder is preferably 15.0 mmol/kg or more and 225.0 mmol/kg or less based on the whole powder. With a niobium content of 15.0 mmol/kg or more, an effect of charge generation is exhibited, and a stability of an oxygen deficiency contributing to transmission of the charge can be obtained. With a niobium content of 225.0 mmol/kg or less, a single phase is formed in the particle, and therefore charge distribution is less likely to be generated, and the charging performance is likely to be stabilized. The niobium content is more preferably 100.0 mmol/kg or more and 200.0 mmol/kg or less, and further preferably 125.0 mmol/kg or more and 200.0 mmol/kg or less. The niobium content is still more preferably 150.0 mmol/kg or more and 200.0 mmol/kg or less.

In the charge-adjustment powder, the content of an alkali metal is 20.0 mmol/kg or less based on the whole powder. A high content of the alkali metal precipitates a salt of the alkali metal on the particle surface to decrease particle boundary resistance. When the particle boundary resistance is low, the applied charge on the particle is likely to flow outward and it becomes difficult to maintain the applied charge. The content of the alkali metal is more preferably 10.0 mmol/kg or less, and further preferably 8.0 mmol/kg or less. In the present description, "alkali metal" refers to sodium and potassium, and "content of the alkali metal" refers to the total content of these two metals.

The alkali metal in the charge-adjustment powder is mainly derived from an alkaline solution that is used to neutralize an acidic mixed liquid of a titanium salt and a niobium salt when the titanium-niobium oxide is formed on at least a part of the surface of the particles that constitute the powder.

In the charge-adjustment powder, the sum of the content of the alkali metal and the content of sulfur is preferably 35.0 mmol/kg or less based on the whole powder. The sum of the content of the alkali metal and the content of sulfur of 38.5 mmol/kg or less is likely to improve a charging maintenance rate measured with a method described later. The sum is more preferably 15.0 mmol/kg or less, and further preferably 13.0 mmol/kg or less.

The reason why the sum of the content of the alkali metal and the content of sulfur affects the charging maintenance rate is unclear, but considered as follows. In the present invention, the alkali metal and sulfur may be brought into the particle from the core or the solution used for forming the titanium-niobium oxide on the core. Both substances of the alkali metal and sulfur may be present in the particle in a state with polarity. When the content of the polar substance is large, it is considered that a circuit is formed in the particle when the particle is charged, the charge is likely to flow outside the particle, and it becomes difficult to maintain the applied charge.

Figure 2:
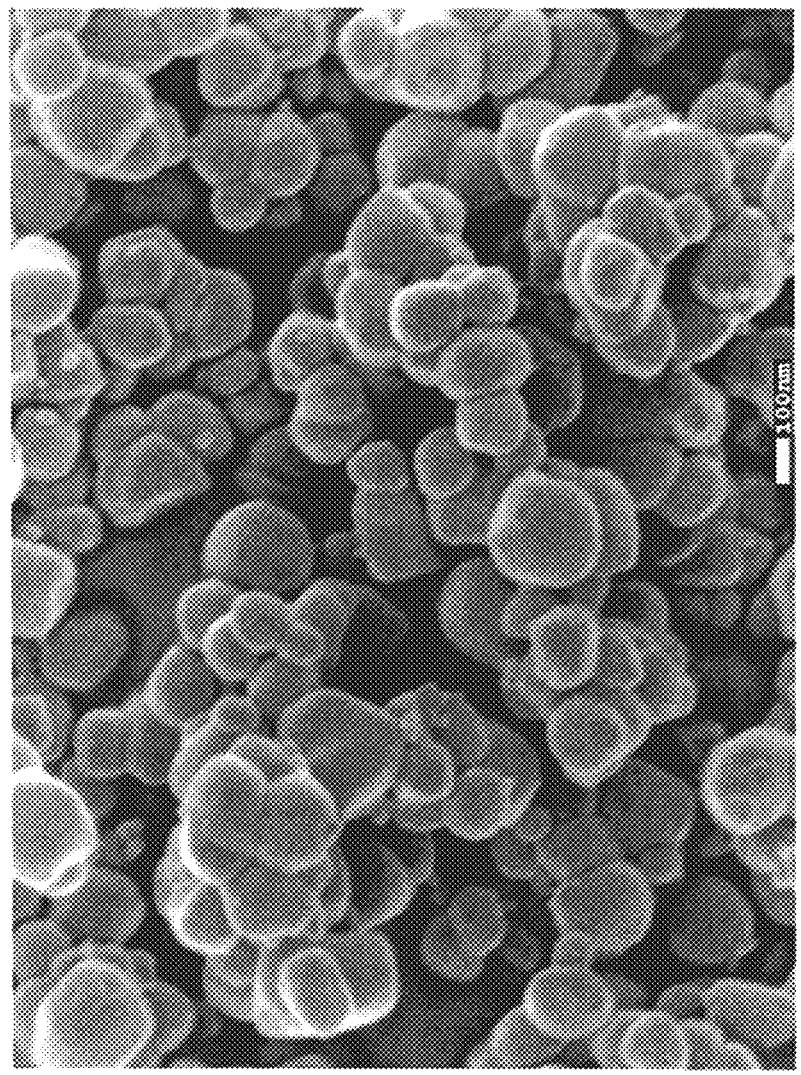
FIG. 2 is a scanning electron microscopic image of a charge-adjustment powder obtained in Comparative Example 1.

In the charge-adjustment powder of the present invention, fine depressions are preferably present on at least a part of the surface of the particles that constitute the powder. The presence of the depressions on the surface reduces a contacting area between primary particles, and charge transfer between the particles is less likely to occur. Here, the depressions on the particle surface refer to fine cavities observed as black spots on the particle surface in a scanning electron microscopic image with a magnification of 50000. The shape of the depression may be a circular, oval, rectangular, polygonal, or irregular shape. A circle-equivalent diameter thereof is 5 nm in a small one, and approximately 45 nm in a large one. Some depressions have a narrow groove shape. Some groove-shaped depressions have a bent shape in the middle, and, in a large one, a width thereof is up to 25 nm and a length is approximately 90 nm. Some depressions reach the core particle, and a depth thereof is approximately 15 nm at maximum. FIG. 1 shows a scanning electron microscopic image of a charge-adjustment powder of the present invention (Example 5, described later), and FIG. 2 shows a scanning electron microscopic image of a comparative charge-adjustment powder (Comparative Example 1, described later). Any of the particle surface of the comparative powder is flat, and the number of depressions is extremely small (FIG. 2). In contrast, it is found that many depressions of black spots can be observed on the particle surface of the powder of the present invention (FIG. 1).

The reason why the depressions are formed on the particle surface has been unclear, but considered as follows. A large quantity of titanium-niobium hydroxide is present on a surface of a core particle before calcination. The calcination evaporates moisture and another component to reduce the volume, resulting in forming the depression.

Meanwhile, when a temperature is high, it is considered that substance diffusion becomes active in the hydroxide and composite oxide of titanium-niobium, and the depressions disappear. Furthermore, it is considered that, when the presence of an alkali metal salt such as sodium the substance diffusion becomes more active, and depressions are more likely to disappear.

In the charge-adjustment powder of the present invention, the number of depressions per 1 $\mu m^2$ of a surface area of the particles is preferably 10 or more. The number of depressions per 1 $\mu m^2$ of the surface area of the particles is more preferably 50 or more, and further preferably 70 or more. The number of depressions per 1 $\mu m^2$ of the surface area of the particles is measured with a method described later.

In the charge-adjustment powder of the present invention, regarding a specific surface area S1 ($m^2/g$) measured with a BET method and a specific surface area S2 ($m^2/g$) calculated based on a median diameter on a volume basis measured by observation using a scanning electron microscope, S1/S2, which is a value of S1 divided by S2, is preferably more than 1.05. S1 and S2 are calculated with methods described below. Since S2 is the specific surface area calculated from the particle diameter, the depressions on the surface are not reflected. Thus, a particle having more depressions on the surface has a larger S2/S2. S1/S2 of more than 1.05, indicating many depressions being present on the particle surface, reduces a contacting area between primary particles, and charge transfer between the particles is less likely to occur. S1/S2 is preferably 1.10 or more, and further preferably 1.15 or more.

In the charge-adjustment powder of the present invention, a value of particle boundary resistance measured with a method described later is preferably $1.80 \times 10^6$ Ω·cm or more, further preferably $2.00 \times 10^6$ Ω·cm or more, and further preferably $4.00 \times 10^6$ Ω·cm or more. With a larger value of the particle boundary resistance, the applied charge is less likely to flow outward and more likely to maintain the applied charge.

The charge-adjustment powder of the present invention preferably has a negative charge amount. An initial value of the charge amount is further preferably −20.0 µC/g or lower, and still preferably −30.0 µC/g or lower.

In the charge-adjustment powder of the present invention, a charging maintenance rate measured with a method described later is preferably 84.0% or more, further preferably 86.0% or more, and further preferably 90.0% or more. A charging maintenance rate measured after humidification with a method described later is preferably 84.0% or more, more preferably 85.5% or more, and further preferably 88.0% or more.

A particle diameter of a primary particle of the particles that constitute the charge-adjustment powder of the present invention is not particularly limited, but preferably 0.050 µm or larger and 0.500 µm or smaller in a median diameter on a volume basis measured with a method described later with considering easiness of crushing after the calcination and dispersibility in the target to be charge-adjusted.

The charge-adjustment powder of the present invention can improve an ability to apply a certain negative charge amount to each of targets to be charge-adjusted such as a paint, a functional powder, a film, a fiber, a resin, a plastic, and a paper, and an ability to maintain the applied charge, by adding the powder into, mixing the powder with, or applying the powder on the targets to be charge-adjusted.

The charge-adjustment powder of the present invention can be prepared by a manufacturing method comprising the following steps A to D:
  step A of dispersing a powder to be a core in water to obtain a suspension of the core;
  step B of adding an acidic mixed liquid of a titanium salt and a niobium salt, and an alkaline solution to the suspension obtained in step A, and neutralizing the acidic mixed liquid of a titanium salt and a niobium salt with the alkaline solution to thereby precipitate hydroxides of titanium and niobium on at least a part of a surface of the core;
  step C of removing water-soluble salts from a suspension obtained in step B and performing solid-liquid separation; and
  step D of calcining a solid obtained in step C.

The method of manufacturing the charge-adjustment powder of the present invention will be described below.

Step A: Core

A core used in step A is preferably anatase-type titanium dioxide. In addition to the anatase-type titanium dioxide, rutile-type titanium dioxide, titanium dioxide with a mixed crystal of anatase-type and rutile-type, and a titanium oxyhydroxide generally represented by a chemical formula $TiO_{2-n/2}(OH)_n$ (n is larger than 0 and smaller than 4) can be preferably used as the core. In particular, a titanium dioxide having an anatase-type single phase or a titanium dioxide having a rutilated ratio determined by X-ray diffraction measurement of 0.05 or less is preferable. When titanium dioxide is used as the core used in step A, a titanium dioxide in which no surface treatment is performed is preferably used to accelerate a subsequent coating with titanium-niobium oxide.

A particle diameter of the core is not particularly limited, but preferably approximately 0.050 to 0.500 µm from a viewpoint of inhibition of aggregating the particles.

In step A, heating with stirring is preferable when the powder to be the core is dispersed in water. A temperature after the heating is preferably within a range of 55 to 85° C., and further preferably 65 to 80° C.

Step B: Acidic Mixed Liquid of Titanium Salt and Niobium Salt

The acidic mixed liquid of a titanium salt and a niobium salt used in step B can be prepared by mixing an aqueous solution of the titanium salt to be a titanium source and an aqueous solution of the niobium salt to be a niobium source. As the titanium source, titanium sulfate, titanium chloride, and the like can be preferably used. As the niobium source, niobium pentachloride, niobium (V) hydroxide, niobium pentoxide, niobium (V) oxyhydroxide, and the like can be preferably used. For dissolving the niobium source, hydrochloric acid or sulfuric acid are preferably used, but nitric acid or an aqueous solution of another acid may also be used. For example, the titanium-niobium acidic mixed liquid can be prepared by dissolving niobium chloride in hydrochloric acid to form a solution at 30 g/kg in terms of a simple substance of niobium, Nb, and then mixing with an aqueous solution of titanium sulfate. The titanium-niobium acidic mixed liquid can also be prepared by dissolving niobium hydroxide and niobium pentoxide in concentrated sulfuric acid to be mixed with an aqueous solution of titanium sulfate.

Step B: Neutralization

In step B, the acidic mixed liquid of a titanium salt and a niobium salt, and an alkaline solution, are added to a suspension obtained in step A, and the acidic mixed liquid of a titanium salt and a niobium salt is neutralized with the alkaline solution, to thereby precipitate hydroxides of titanium and niobium on at least a part of a surface of the core. When a suspension obtained in step B is solid-liquid separated and a dried sample is observed with a transmission electron microscope, 90% or more of the core surface is preferably coated with the hydroxides of titanium and niobium. The pH of the suspension when the acidic mixed liquid and the alkaline solution are added is preferably within a range of 1.0 or higher and 6.0 or lower. The pH is more preferably 2.0 or higher and 4.0 or lower. The pH is preferably maintained at a constant value within the above range. In order to maintain the pH at a constant value, the acidic mixed liquid of a titanium salt and a niobium salt and the alkaline solution are preferably added simultaneously.

The alkaline solution added for neutralization is not particularly limited, and one or more selected from sodium hydroxide, potassium hydroxide, sodium carbonate, or ammonia can be preferably used. Sodium hydroxide is advantageous in terms of cost.

A temperature during the neutralization is preferably held at a constant value within a range of 55 to 85° C., and more preferably within a range of 65 to 80° C.

After finishing the addition of the acidic mixed liquid and the alkaline solution, the suspension mays be optionally held at a predetermined pH and a predetermined temperature for a certain time to perform aging. The temperature and the pH in this time are not particularly limited. The holding time is not particularly limited, but preferably approximately 10 minutes to 2 hours.

Step C: Removal of Water-Soluble Salts, and Solid-Liquid Separation

In step C, repeated washing is preferably performed by using an aqueous solvent with a low impurity content to remove water-soluble salts so that a remained content of the water-soluble salts in the suspension obtained in step B is minimized as low as possible. For washing during the removal of the water-soluble salts, an apparatus such as a filter press can be optionally used.

The water-soluble salts include salts derived from the acidic mixed liquid and the alkaline solution. As a criterion of degree of removing the water-soluble salts in step C, the content of an alkali metal and the content of a sulfur in a solid content in the suspension can be used. Since the alkali metal is mainly derived from the alkaline solution, a content of sodium may also be used as the criterion of degree of removing the water-soluble salts when, for example, sodium hydroxide or sodium carbonate is used in the alkaline solution. Sulfur is mainly derived from sulfuric acid. The contents of the alkali metal (for example, sodium) and sulfur can be evaluated with a method described later, after sampling a part of a solid content after the washing, and sufficiently drying the part of the washed solid content.

Since sulfur is evaporated at high temperature and the content thereof reduces after calcination, a certain degree of amount of sulfur may be remained in a stage of step C.

An alkali metal content in the solid content after the washing in step C is preferably 18.5 mmol/kg or less, more preferably 10.0 mmol/kg or less, and further preferably 5.0 mmol/kg or less. A sulfur content in the solid content after the washing in step C is preferably 230.0 mmol/kg or less, more preferably 200.0 mmol/kg or less, and further preferably 150.0 mmol/kg or less.

After removing the above water-soluble salts, solid-liquid separation is performed to obtain a solid. The obtained solid may be optionally dried. The temperature and time during the dry are not particularly limited, and for example, at 100 to 150° C. for 1 to 24 hours.

Step D: Calcination

The temperature during the calcination is preferably 250° C. or higher and 900° C. or lower. The calcination atmosphere is not particularly limited, and the calcination may be performed under an atmosphere having a higher oxygen concentration than air, an air atmosphere, an atmosphere having a lower oxygen concentration than air, a non-oxidative atmosphere of nitrogen gas, or a reducing atmosphere of hydrogen gas. Calcination in the atmosphere containing oxygen can oxidize the particle surface, and calcination in the non-oxidative atmosphere or the reducing atmosphere can reduce the particle surface. The atmosphere may be changed to perform two-step calcination or three or more step calcination, and atmospheres and temperatures in the second or third or more calcinations can be appropriately changed depending on a proceeding degree of oxidation on the particle surface. Adjusting a proceeding of the surface oxidation or reduction can adjust resistance, charging performance, and color tone of the powder after the calcination. The calcination time, holding time, and flow rate of the atmosphere gas can be appropriately adjusted depending on desired properties of the powder, the size of the furnace to be used, or the amount of the solid added. For example, the first calcination is preferably performed under the non-oxidative atmosphere or the reducing atmosphere at a temperature of 250° C. or higher and 780° C. or lower, and then the second calcination is preferably performed at an air atmosphere at a temperature of 250° C. or higher and 500° C. or lower, but not limited thereto.

Crush

The obtained calcinated product may be appropriately crushed to form the charge-adjustment powder. For the crushing, known methods such as a roller mill, a jet mill, a container-driving mill can be used without limitation, and the product can be crushed with a common crushing machine. The crushing method is selected with considering the particle diameter, a rate of crude particles in the crushed product, cost, and the like.

Next, methods of measuring physical properties of the charge-adjustment powder will be described.

Method of Measuring Rutilated Ratio of Titanium Dioxide

Diffraction intensities of (101) planes of anatase-type titanium dioxide and (110) planes of rutile-type titanium dioxide are measured by using an X-ray diffraction apparatus RINT-TTR III, manufactured by Rigaku Corporation, under conditions of a target of copper (Cu), a tube voltage of 50 kV, a tube current of 300 mA, a divergence slit of ½°, a divergence vertical slit of 10 mm, a scattering slit of ½°, a light receiving slit of 0.15 mm, and a scanning rate of 0.5°/min, and by scanning a range from 20 deg to 35 deg with 2θ. The diffraction intensity (R) of the (110) planes of the rutile-type titanium dioxide is divided by a sum of the diffraction intensity (A) of the (101) planes of the anatase-type titanium dioxide and the diffraction intensity (R) of the (110) planes of the rutile-type titanium dioxide to determine the rutilated ratio.

Rutilated Ratio=$R/(A+R)$

Method of Measuring Contents of Niobium, Sulfur, and Alkali Metal

Niobium, potassium, and a sulfur are measured by using a fluorescent X-ray analyzer and using intensities of the characteristic X-rays to determine the contents. The content of sodium is determined with an ICP method by using a dissolved sample.

Method of Measuring Specific Surface Area S1 with BET Method

The specific surface area S1 with the BET method is measured by using GEMINI 2375, manufactured by MICROMETORICS INSTRUMENT CO., with the single-point method.

Method of Measuring Median Diameter on Volume Basis of Primary Particles and Calculating Specific Surface Area S2

For observing a sample with a scanning electron microscope (hereinafter, abbreviated as "SEM"), JESM-7200, manufactured by JEOL Ltd., is used. From the image, 200 or more primary particles are measured. A circle-equivalent diameter of the projected area is determined and is used as the primary particle diameter. In the present invention, in a case where two or more particles are bonded due to the calcination, the particle diameter of each particle is measured only when the boundary can be determined from the SEM image. A particle diameter equivalent to 50% in a cubic cumulative curve is specified as the median diameter on a volume basis. When the median diameter on a volume basis is $r_v$ μm, the specific surface area S2 is calculated with the following formula.

$S2 = 4 \times \pi \times [(r_v/2)/10^6]^2 / \{4/3 \times \pi \times [(r_v/2)/10^6]^3 \times \text{Particle Density (g/m}^2)\}$ In Examples and Comparative Examples, described later, the particle is constituted with approximately 97.7% of anatase-type titanium dioxide (particle density of $3.90 \times 10^6$ g/m³) and approximately 2.3% of diniobium pentoxide (particle density of $4.47 \times 10^6$ g/m³); thus, $3.93 \times 10^6$ g/m³ was used as the particle density in the above formula.

Method of Measuring Number of Depressions Per Unit Area of Particle Surface

The particle is observed by using an SEM with a magnification of 50000, and on 200 or more particles with a fully appeared half surface of the particle, the number of depressions present on the half surface is counted. The depressions are observed as black spots on the particle surface in the SEM image. The number of the depressions is doubled to be specified as the number of depressions present on the surface per particle. With the above primary particle diameter, a square cumulative curve of the particle diameter is prepared, and a particle diameter equivalent to 50% thereof is specified as a median diameter on an area basis (μm). A surface area per particle is calculated from the median diameter on an area basis. On one particle, a value (two significant digits) in which the number of depressions is divided by the particle area is specified as the number of depressions per unit area of the particle surface.

Method of Measuring Particle Boundary Resistance

Figure 3:
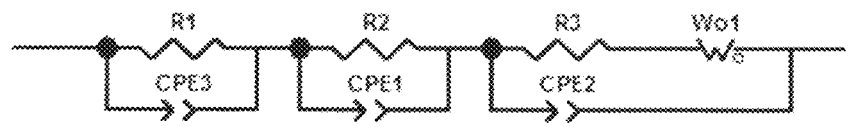
FIG. 3 is an equivalent circuit model used for calculating particle boundary resistance.

A sample (1 g) is compressed with a jig for measuring resistance of powder, manufactured by TOYO Corporation, and measured by using Versa STAT4, manufactured by Princeton Applied Research, with a voltage of 300 mV and a frequency of $10^{-3}$ Hz or higher and $10^6$ or lower to obtain a Nyquist diagram. This is fitted with an equivalent circuit to determine the particle boundary resistance on an assumption that there are three resistant components of bulk resistance, particle boundary resistance, and electrode contacting resistance. FIG. 3 illustrates an equivalent circuit model used for calculating the particle boundary resistance.

Method of Measuring Charging Maintenance Rate of Powder 0.100 g of a sample and 9.900 g of an iron powder carrier is mixed, and the mixture is added into a polyethylene bottle with 40 mm in diameter and 85 mm in height. The bottle is shaken with Paint Shaker 5110, manufactured by Red Devil Inc., for 1 minute to frictionally charge the sample. Then, a powder charge amount is quickly measured with a powder charge amount measuring apparatus TB-200, manufactured by Toshiba Chemical Corp., to be specified as an initial value of the charge amount. After the measurement, the sample is left to stand for 4 minutes with a state of mixed with the iron powder carrier, and then the measurement is performed again. A value in which the measured value after 4 minutes is divided by the initial value is specified as the charging maintenance rate.

Method of Measuring Powder Charging Maintenance Rate of Humidified Sample

A sample is left to stand for 48 hours under a humid environment at a temperature of 40° C. and a relative humidity of 98%, and then a powder charging maintenance rate is measured in the same manner as above.

EXAMPLES

The present invention will be described in more detail with the following Examples and Comparative Examples. The following examples are described simply for exemplifying, and the scope of the invention is not limited thereby.

Example 1

Niobium (V) hydroxide was dissolved in concentrated sulfuric acid, and mixed with an aqueous solution of titanium sulfate to prepare an acidic mixed liquid of the titanium salt and the niobium salt (hereinafter, referred to as "titanium-niobium mixed liquid"). A titanium dioxide powder with untreated surface having an average diameter of primary particles of 0.18 μm and a rutilated ratio of 0.01 was dispersed in water to form a suspension, and the suspension was heated with stirred. When the suspension became at 70° C., the titanium-niobium mixed liquid, which contained 337 g/kg of Ti and 20.6 g/kg of Nb based on a weight of titanium dioxide to be a core, and an aqueous solution of sodium hydroxide were added simultaneously with maintaining a pH at 2.5. After finishing the addition, an aqueous solution of sodium hydroxide was added to adjust a pH of the reaction liquid to be 5.5, the reaction liquid was maintained at 70° C. for 0.5 hours, then cooled, subsequently washed until a sodium content in the solid content reached less than 0.2 mmol/kg and a sulfur content reached 11.9 mmol/kg, and solid-liquid separated. The solid after the washing was dried in a dryer at 110° C. for 12 hours. The dried solid was calcined in nitrogen gas at 700° C. for 2 hours, the calcined product was further calcined in an air atmosphere at 430° C. for 2 hours, and crushed to produce sample 1.

Sample 1 was measured with fluorescent X-ray and ICP methods, and a niobium content was 170.1 mmol/kg, an alkali metal content was 1.5 mmol/kg, and the sum of the alkali metal content and a sulfur content was 5.2 mmol/kg. A specific surface area S1 determined with the BET method was 9.00 m$^2$/g. A median diameter on a volume basis of primary particles analyzed from an SEM image was 0.226 μm, a surface area per 1 g S2 calculated from the median diameter on a volume basis was 6.77 m$^2$/g, and S1/S2 was 1.33. A median diameter on an area basis was 0.203 μm, and the number of depressions per unit area was 100/μm$^2$. A particle boundary resistance was 6.90×10$^6$ Ω·cm, an initial value of a charge amount was −42.2 μC/g, a charging maintenance rate was 91.1%, and a charging maintenance rate of a humidified sample was 89.1%.

Example 2

Sample 2 was produced in the same manner as in Example 1 except that: after cooling the reaction liquid, the washing was finished when a sodium content in a solid content reached 2.3 mmol/kg and a sulfur content reached 14.7 mmol/kg; and a temperature of the second calcination was set to be 400° C. Of sample 2, a niobium content was 176.1 mmol/kg, an alkali metal content was 5.8 mmol/kg, the sum of the alkali metal content and a sulfur content was 9.6 mmol/kg, S1/S2 was 1.36, and the number of depressions per unit area of the particle surface was 100/μm$^2$. A particle boundary resistance was 5.50×10$^6$ Ω·cm, an initial value of a charge amount was −36.3 μC/g, a charging maintenance rate was 99.4%, and a charging maintenance rate of a humidified sample was 98.5%.

Example 3

Sample 3 was produced in the same manner as in Example 1 except that, after cooling the reaction liquid, the washing was finished when a sodium content in a solid content reached 3.9 mmol/kg and a sulfur content reached 7.9 mmol/kg. Of sample 3, a niobium content was 173.8 mmol/kg, an alkali metal content was 7.2 mmol/kg, the sum of the alkali metal content and a sulfur content was 12.2 mmol/kg, S1/S2 was 1.23, and the number of depressions per unit area of the particle surface was 74/μm$^2$. A particle boundary resistance was 5.80×10$^6$ Ω·cm, an initial value of a charge amount was −35.0 μC/g, a charging maintenance rate was 94.1%, and a charging maintenance rate of a humidified sample was 98.0%.

Example 4

Sample 4 was produced in the same manner as in Example 1 except that: after finishing the addition of the titanium-niobium mixed liquid and the aqueous solution of sodium hydroxide, the adjustment of the pH of the reaction liquid to be 5.5 was not performed and the reaction liquid was maintained at the pH of 2.5 at 70° C. for 0.5 hours; after cooling the reaction liquid, the washing was performed until a sodium content in a solid content reached less than 0.2 mmol/kg and a sulfur content reached 83.2 mmol/kg; and a temperature of the first calcination was set to be 750° C. and a temperature of the second calcination was set to be 450° C. Of sample 4, a niobium content was 167.0 mmol/kg, an alkali metal content was 1.7 mmol/kg, the sum of the alkali metal content and a sulfur content was 14.2 mmol/kg, S1/S2 was 1.27, and the number of depressions per unit area of the particle surface was 100/μm$^2$. A particle boundary resistance was 2.30×10$^6$ Ω·cm, an initial value of a charge amount was −37.8 μC/g, a charging maintenance rate was 87.7%, and a charging maintenance rate of a humidified sample was 85.9%.

Example 5

Sample 5 was produced in the same manner as in Example 1 except that: after finishing the addition of the titanium-niobium mixed liquid and the aqueous solution of sodium hydroxide, the adjustment of the pH of the reaction liquid to be 5.5 was not performed and the reaction liquid was maintained at the pH of 2.5 at 70° C. for 0.5 hours; after cooling the reaction liquid, the washing was performed until a sodium content in a solid content reached less than 0.2 mmol/kg and a sulfur content reached 175.1 mmol/kg; and a temperature of the first calcination was set to be 780° C. and a temperature of the second calcination was set to be 470° C. FIG. 1 shows an SEM image of sample 5. Of sample 5, a niobium content was 170.4 mmol/kg, an alkali metal content was 1.5 mmol/kg, the sum of the alkali metal content and a sulfur content was 30.2 mmol/kg, S1/S2 was 1.57, and the number of depressions per unit area of the particle surface was 110/μm$^2$. A particle boundary resistance was 1.30×10$^7$ Ω·cm, an initial value of a charge amount was −47.6 μC/g, a charging maintenance rate was 84.7%, and a charging maintenance rate of a humidified sample was 85.2%.

Example 6

Sample 6 was produced in the same manner as in Example 1 except that: after cooling the reaction liquid, the washing was performed until a sodium content in a solid content reached less than 0.2 mmol/kg and a sulfur content reached 8.6 mmol/kg; and a temperature of the first calcination was set to be 730° C. Of sample 6, a niobium content was 174.6 mmol/kg, an alkali metal content was 2.1 mmol/kg, the sum of the alkali metal content and a sulfur content was 5.9 mmol/kg, S1/S2 was 1.33, and the number of depressions per unit area of the particle surface was 110/μm$^2$. A particle boundary resistance was 8.20×10$^6$ Ω·cm, an initial value of a charge amount was −44.7 μC/g, a charging maintenance rate was 92.2%, and a charging maintenance rate of a humidified sample was 86.5%.

Comparative Example 1

Sample 6 was produced in the same manner as in Example 1 except that: after cooling the reaction liquid, the washing was finished when a sodium content in a solid content reached 26.4 mmol/kg and a sulfur content reached 10.4 mmol/kg; and a temperature of the first calcination was set to be 800° C. and a temperature of the second calcination was 450° C. Of sample 6, a niobium content was 164.2 mmol/kg, an alkali metal content was 31.0 mmol/kg, the sum of the alkali metal content and a sulfur content was 39.8 mmol/kg, S1/S2 was 0.98, and the number of depressions per unit area of the particle surface was 1.4/μm². A particle boundary resistance was $1.50×10^6$ Ω·cm, an initial value of a charge amount was −23.9 μC/g, a charging maintenance rate was 83.0%, and a charging maintenance rate of a humidified sample was 82.9%.

Comparative Example 2

Sample 7 was produced in the same manner as in Example 1 except that: when the titanium-niobium mixed liquid and the aqueous solution of sodium hydroxide were added and when the reaction liquid was maintained after finishing the addition, a temperature of the reaction liquid was set to be 60° C.; after cooling the reaction liquid, the washing was finished when a sodium content in a solid content reached 39.4 mmol/kg and a sulfur content reached 6.7 mmol/kg; and a temperature of the first calcination was set to be 800° C. and a temperature of the second calcination was set to be 450° C. Of sample 7, a niobium content was 169.9 mmol/kg, an alkali metal content was 44.7 mmol/kg, the sum of the alkali metal content and a sulfur content was 50.9 mmol/kg, S1/S2 was 0.96, and the number of depressions per unit area of the particle surface was 8.1/μm². A particle boundary resistance was $1.60×10^6$ Ω·cm, an initial value of a charge amount was −47.9 μC/g, a charging maintenance rate was 83.6%, and a charging maintenance rate of a humidified sample was 80.4%.

Table 1 shows: the neutralizing pH and the reaction temperature in step B, the alkaline solution used, the sodium content and the sulfur content when the washing was finished in step C, the calcining atmosphere and the calcining temperature in step D, during the production of each sample; and the values of properties of each obtained sample (the niobium content, the sodium content, a potassium content, the alkali metal content, the sum of the alkali metal content and the sulfur content, S1/S2, the number of depressions per unit area of the particle surface, the particle boundary resistance, the charging maintenance rate, and the charging maintenance rate of the humidified sample).

TABLE 1

| | | | Example 1 | Example 2 | Example 3 | Example 4 |
|---|---|---|---|---|---|---|
| Manufacturing condition | Neutralizing pH | | 2.5 | 2.5 | 2.5 | 2.5 |
| | Reaction temperature | ° C. | 70 | 70 | 70 | 70 |
| | Type of alkaline solution | | NaOH | NaOH | NaOH | NaOH |
| | Criterion of finishing washing — Sodium amount | mmol/kg | less than 0.2 | 2.3 | 3.9 | less than 0.2 |
| | Criterion of finishing washing — Sulfur amount | mmol/kg | 11.9 | 14.7 | 7.9 | 83.2 |
| | First calcination — Atmosphere | | in nitrogen | in nitrogen | in nitrogen | in nitrogen |
| | First calcination — Temperature | ° C. | 700 | 700 | 700 | 750 |
| | Second calcination — Atmosphere | | in air | in air | in air | in air |
| | Second calcination — Temperature | ° C. | 430 | 400 | 430 | 450 |
| Properties of sample | Niobium content | mmol/kg | 170.1 | 176.1 | 173.8 | 167.0 |
| | Sodium content | mmol/kg | 0.2 | 2.2 | 4.5 | 0.2 |
| | Potassium content | mmol/kg | 1.3 | 3.6 | 2.8 | 1.5 |
| | Alkali metal content | mmol/kg | 1.5 | 5.8 | 7.2 | 1.7 |
| | Contents of alkali metal + sulfur | mmol/kg | 5.2 | 9.6 | 12.2 | 14.2 |
| | S1/S2 | | 1.33 | 1.36 | 1.23 | 1.27 |
| | Depression | /μm² | 100 | 100 | 74 | 100 |
| | Particle boundary resistance | Ω·cm | $6.90 × 10^6$ | $5.50 × 10^6$ | $5.80 × 10^6$ | $2.30 × 10^6$ |
| | Initial value of charge amount | μC/g | −42.2 | −36.3 | −35.0 | −37.8 |
| | Charging maintenance rate | % | 91.1 | 99.4 | 94.1 | 87.7 |
| | Charging maintenance rate after humidified | % | 89.1 | 98.5 | 98.0 | 85.9 |

| | | | Example 5 | Example 6 | Comparative Example 1 | Comparative Example 2 |
|---|---|---|---|---|---|---|
| Manufacturing condition | Neutralizing pH | | 2.5 | 2.5 | 2.5 | 2.5 |
| | Reaction temperature | ° C. | 70 | 70 | 70 | 60 |
| | Type of alkaline solution | | NaOH | NaOH | NaOH | NaOH |
| | Criterion of finishing washing — Sodium amount | mmol/kg | less than 0.2 | less than 0.2 | 26.4 | 39.4 |
| | Criterion of finishing washing — Sulfur amount | mmol/kg | 175.1 | 8.6 | 10.4 | 6.7 |
| | First calcination — Atmosphere | | in nitrogen | in nitrogen | in nitrogen | in nitrogen |
| | First calcination — Temperature | ° C. | 780 | 730 | 800 | 800 |
| | Second calcination — Atmosphere | | in air | in air | in air | in air |
| | Second calcination — Temperature | ° C. | 470 | 430 | 450 | 450 |
| Properties of sample | Niobium content | mmol/kg | 170.4 | 174.6 | 164.2 | 169.9 |
| | Sodium content | mmol/kg | 0.2 | 0.2 | 28.1 | 41.9 |
| | Potassium content | mmol/kg | 1.3 | 1.9 | 3.0 | 2.8 |
| | Alkali metal content | mmol/kg | 1.5 | 2.1 | 31.0 | 44.7 |
| | Contents of alkali metal + sulfur | mmol/kg | 30.2 | 5.9 | 39.8 | 50.9 |
| | S1/S2 | | 1.57 | 1.33 | 0.98 | 0.96 |
| | Depression | /μm² | 110 | 110 | 1.4 | 8.1 |
| | Particle boundary resistance | Ω·cm | $1.30 × 10^7$ | $8.20 × 10^6$ | $1.50 × 10^6$ | $1.60 × 10^6$ |
| | Initial value of charge amount | μC/g | −47.6 | −44.7 | −23.9 | −47.9 |
| | Charging maintenance rate | % | 84.7 | 92.2 | 83.0 | 83.6 |
| | Charging maintenance rate after humidified | % | 85.2 | 86.5 | 82.9 | 80.4 |

The charge-adjustment powder of the present invention has the initial value of the charge amount of −30.0 μC/g or lower. The charge-adjustment powder of the present invention has higher particle boundary resistance and charging maintenance rate than a charge-adjustment powder having the alkali metal content of more than 20.0 mmol/kg and the sum of the alkali metal content and the sulfur content of more than 35.0 mmol/kg. From the above, the charge-adjustment powder of the present invention is found to have an excellent ability to regulate the charging within a certain range, and to maintain the applied charge. Furthermore, since having a high charging maintenance rate even after exposed to high humidity, the charge-adjustment powder of the present invention is found to have an excellent ability to maintain the applied charge even under a highly humid environment.

The invention claimed is:

1. A charge-adjustment powder comprising particles having titanium-niobium oxide on at least a part of a surface of a core, wherein a content of an alkali metal is 1.5 mmol/kg to 20.0 mmol/kg based on the whole powder, and wherein the content of the alkali metal is the total content of sodium and potassium.

2. The charge-adjustment powder according to claim 1, wherein a sum of the content of the alkali metal and a content of sulfur is 35.0 mmol/kg or less based on the whole powder.

3. The charge-adjustment powder according to claim 1, wherein a content of niobium is 15.0 mmol/kg or more and 225.0 mmol/kg or less based on the whole powder.

4. The charge-adjustment powder according to claim 1, wherein the core is titanium dioxide.

5. The charge-adjustment powder according to claim 1, wherein depressions are observed on at least a part of a surface of the particles that constitute the powder when observed using a scanning electron microscope with a magnification of 50000.

6. The charge-adjustment powder according to claim 1, wherein a number of depressions observed on a surface of the particles that constitute the powder when observed using a scanning electron microscope with a magnification of 50000 is 10 or more per 1 $\mu m^2$ of the surface of the particles.

7. The charge-adjustment powder according to claim 1, wherein S1/S2 is more than 1.05, where S1 represents a surface area per 1 g measured with a BET method, and S2 represents a surface area per 1 g calculated from a median diameter on a volume basis obtained by observation with a scanning electron microscope.

8. A method of manufacturing the charge-adjustment powder according to claim 1, comprising the following steps A to D:
   step A of dispersing a powder to be a core in water to obtain a suspension of the core;
   step B of adding an acidic mixed liquid of a titanium salt and a niobium salt, and an alkaline solution to the suspension obtained in step A, and neutralizing the acidic mixed liquid of a titanium salt and a niobium salt with the alkaline solution, to thereby precipitate hydroxides of titanium and niobium on at least a part of a surface of the core;
   step C of removing water-soluble salts from a suspension obtained in step B and performing solid-liquid separation to form a solid having an alkali metal content of 1.5 mmol/kg to 18.5 mmol/kg, and wherein the content of the alkali metal is the total content of sodium and potassium; and
   step D of calcining the solid obtained in step C.

9. The method of manufacturing the charge-adjustment powder according to claim 8, wherein in step B, the neutralization is performed at a pH of the suspension of 1.0 or higher and 6.0 or lower.

10. The method of manufacturing the charge-adjustment powder according to claim 8, wherein in step B, the acidic mixed liquid of a titanium salt and a niobium salt, and the alkaline solution are added simultaneously.

11. The method of manufacturing the charge-adjustment powder according to claim 8, wherein step D comprises calcining the solid at 250° C. or higher and 900° C. or lower in an air atmosphere, an inert atmosphere, a reducing atmosphere, or an atmosphere having a lower oxygen concentration than air.

* * * * *